United States Patent Office 3,377,328
Patented Apr. 9, 1968

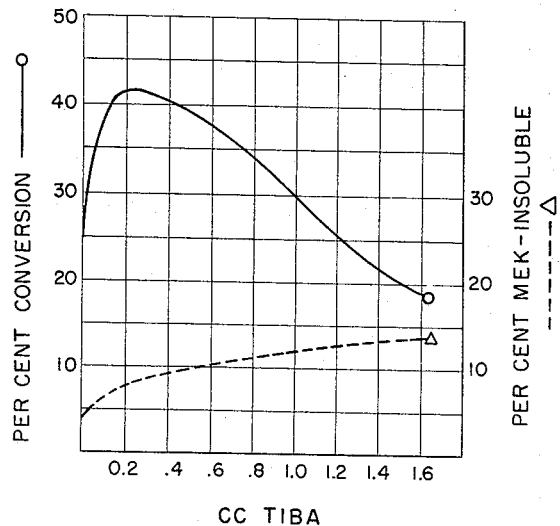
EFFECT OF TIBA ADDITION ON POLYMER CONVERSION AND MEK INSOLUBLE FRACTION
FIG. 1
EFFECT OF DIETHYL ZINC ON PER CENT CONVERSION AND INHERENT VISCOSITY
FIG. 2
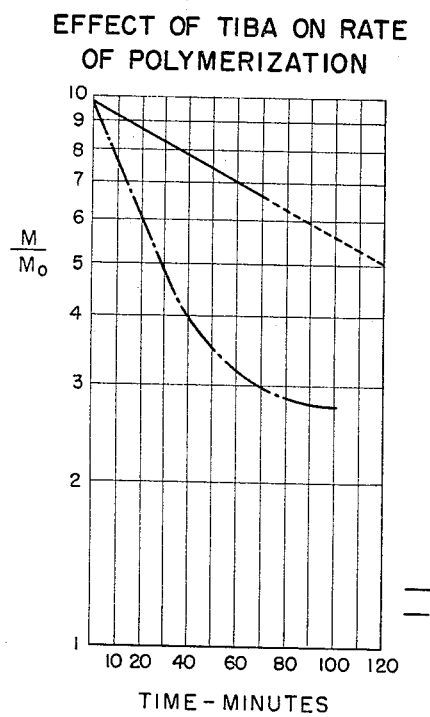
EFFECT OF TIBA ON RATE OF POLYMERIZATION
FIG. 3
—— CONTROL
—·— WITH TIBA
INVENTOR.
JOGINDER LAL
BY JAMES E. McGRATH
ATTORNEY

3,377,328
POLYMERIZATION OF VINYL ALKYL ETHER IN THE PRESENCE OF A METAL HYDROSULFATE AND AN ORGANO-METALLIC PROMOTER
Joginder Lal, Akron, and James E. McGrath, Cuyahoga Falls, Ohio, assignors to The Goodyear Tire & Rubber Company, Akron, Ohio, a corporation of Ohio
Filed Apr. 1, 1965, Ser. No. 444,730
16 Claims. (Cl. 260—91.1)

ABSTRACT OF THE DISCLOSURE

Controlled amounts of an organometallic promoter, such as triethylaluminum or diethylzinc, when added to a vinyl alkyl ether prior to the addition of a metal (e.g. aluminum) hydrosulfate polymerization catalyst results in (1) an increased rate of polymerization or higher overall polymer yield; (2) a higher molecular weight polymer; and (3) a higher proportion of methyl ethyl ketone-insoluble fraction of the polymer, arising from a greater degree of stereoregularity in the polymer, than when the organometallic compound is not used in the manner indicated.

---

This invention relates to a process for producing high molecular weight poly(vinyl alkyl ethers). More particularly, it relates to an improved catalyst system which employs novel promoters for use with a metal hydrosulfate catalyst.

It is known that metal sulfate-sulfuric acid complexes are active catalysts for the room temperature polymerization of vinyl alkyl ethers to yield high molecular weight materials. Aluminum hydrosulfate and ferric hydrosulfate are particularly useful catalysts for this purpose. Their preparations and uses are disclosed in United States Patents 2,549,921 and 2,984,656, the teachings of which are specifically incorporated herein by reference. The amounts of crystalline or crystallizable polymer fractions in polymers produced with these catalysts are quite small, especially when the alkyl group in the polymer is linear. It should also be noted that various investigators in this field have not been in complete accord in regard to the chemical composition of the metal sulfate-sulfuric acid complex. When employed in this specification and claims, "aluminum hydrosulfate" means any complex resulting from the reaction of aluminum sulfate and sulfuric acid.

It has now been discovered that in the polymerization of vinyl alkyl ether with metal hydrosulfate catalysts, the addition of controlled amounts of an organometallic promoter to the monomer, prior to the addition of the catalyst, significantly improves the polymerization reaction and/or polymer characteristics.

This result is seen to be entirely unpredictable when it is made known that metal alkoxides in combination with metal hydrosulfate catalysts do not improve the polymer characteristics as defined below. Such a result might well be anticipated since metal alkoxides and metal alkyls are both known to react with sulfuric acid to form complexes which catalyze the polymerization of vinyl alkyl ethers to high molecular weight crystalline materials. By analogy, one might assume they would both act as promoters but this is found not to be the case.

The improvements made possible by this invention may exist singularly or in combination as: (1) an increased rate of polymerization or higher overall polymer yield; (2) a higher inherent viscosity of the polymer, reflecting higher molecular weight; (3) higher methyl ethyl ketone (MEK)-insoluble fraction, representing easily crystallizable or crystalline material.

The polymers produced by the practice of this invention are characterized by their (1) inherent viscosity, and (2) MEK-insoluble fraction. Inherent viscosity is defined as the natural logarithm of the relative viscosity at 30° C. divided by the polymer concentration for an 0.05 to 0.10 percent (w./v.) solution in benzene containing 0.1 percent phenyl beta-naphthylamine, and expressed in units of dl./g. The MEK-insoluble fraction was determined by suspending one gram of polymer in 200 ml. of MEK for 96 hours at 25° C. The contents were shaken occasionally. The polymer solution was carefully decanted and the insoluble portion, carefully washed with a small portion of fresh MEK, vacuum dried and weighed.

The organometallic promoter employed in the practice of this invention is represented by the general formula $MR_n$ wherein:

M represents the metals, aluminum, gallium, zinc and cadmium; R represents a lower alkyl or alkenyl radical containing up to 10 carbon atoms, an aryl radical or hydrogen; and $n$ represents the valence of M.

It will be observed that the straight metal hydride which is also within the scope of this formula, will in fact function as a promoter. Therefore, where the term organometallic promoter is employed, it is intended to include the hydride also. However, it is preferred to use an organometal compound or an organometallic hydride of the type disclosed in practicing the invention. It is most preferred to employ trialkylaluminum or dialkylzinc containing lower alkyl groups.

Examples of suitable promoters which may usefully be employed in the practice of this invention are: triisobutylaluminum, tri-n-propylaluminum, triethylaluminum, diisobutylaluminum hydride, trialkylaluminum, triphenylaluminum, triethylgallium, diethylzinc, di-n-butylzinc, diallyzinc, dimethylcadmium, diethylcadmium.

The organometallic promoter must be brought into contact with the monomer, or monomer-solvent mixtures, prior to the monomer being reacted with the metal sulfate-sulfuric acid complex catalyst. It is not critical whether or not the promoter is introduced immediately preceding the introduction of the catalyst or is introduced at a time considerably in advance of the introduction of the catalyst. It was found that when the promoter and metal sulfate-sulfuric acid complex were prereacted with each other before being added to the monomer, the polymerization was extremely sluggish.

The organometallic promoter is most useful when employed in controlled quantities. The molar ratio of the organometallic promoter to the catalyst should be between about 1:1 and 350:1, and preferably between 4:1 and 175:1. The effective range of the molar ratio of the promoter to the catalyst can be greatly altered by the purity of the monomer, solvent and the polymerization reaction vessel. It is preferred to use monomers and solvents of high purity. The most suitable ratio for a particular promoter/catalyst system may be easily ascertained by experimental procedures known to persons skilled in this art and demonstrated in the examples which follow.

Aluminum hydrosulfate catalyst was prepared according of Example No. 3 of U.S. Patent No. 2,549,921. It is referred to for convenience hereinafter as AHS.

The powdered catalyst was dispersed in dried mineral oil in the presence of dry porcelain balls to give a 1.57 or 2 percent (w./v.) suspension. For calculating molar ratios of organometallic compound to AHS, the latter was considered to be

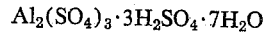

The vinyl alkyl ether was washed with water, dried over KOH, then refluxed and distilled at least twice over sodium wire. n-Heptane and n-pentane were distilled over phosphorus pentoxide before use.

Polymerization conditions are in general the same as those employed in the prior art references noted, supra, with the exception that the reaction rate is substantially increased as demonstrated in the following examples which serve to further illustrate the invention but are not to be construed as limiting it thereto.

The polymerization runs were carried out by mixing a monomer and solvent in a clean dry 4-oz. bottle which was subsequently purged with nitrogen. The bottle was then fitted with a screw cap and self-sealing rubber gasket. The specified amount of organometallic solution was syringed into the bottle and after a given time was followed by injection of the catalyst suspension. The polymerization mass was shaken occasionally. The duration and polymerization temperature are noted in Tables I to III. The polymer was precipitated with excess methanol containing a small amount of phenyl beta-naphthylamine (PBNA) stabilizer and dried for 64 hours at 40° C. and 2 torr.

Polymerization rate studies were conducted in a 4-necked, 1-liter flask fitted with a stirrer, thermometer, condenser with a drying tube and serum cap. The detailed procedural techniques employed are described in J. Polymer Science, Part A, vol. 2, pp. 3369–3386 (1964).

TABLE I

Polymerization of vinyl n-butyl ether with AHS catalyst: Effect of the addition of triisobutylaluminum (TIBA) solution. 80 ml. heptane, 20 ml. monomer, 0.65 molar TIBA solution, 0.1 ml. AHS catalyst suspension (added immediately after TIBA), 2%. Polymerization at 25° C. for 15 minutes.

| Run No. | Ml. TIBA Solution | Polymer Conversion, Percent | MEK-Insoluble, Percent |
|---|---|---|---|
| 1 | None | 25 | 4.1 |
| 2 | 0.1 | 42 | 6.2 |
| 3 | 0.2 | 41 | 8.3 |
| 4 | 0.4 | 39 | 9.1 |
| 5 | 0.8 | 37 | |
| 6 | 1.6 | 14 | 14.0 |

TABLE II

Polymerization of vinyl n-butyl ether with AHS catalyst: Effect of the addition of TIBA solution. 60 ml. pentane, 15 ml. monomer, 0.65 molar TIBA solution, 0.4 ml. AHS catalyst suspension (added 16 hours after TIBA addition) 1.57%. Polymerization at 5° C. for 6.5 hours.

| Run No. | Ml. TIBA Solution | Polymer conversion, Percent | Inherent Viscosity |
|---|---|---|---|
| 7 | None | 41 | 2.65 |
| 8 | 0.1 | 75 | 3.0 |
| 9 | 0.2 | 74 | 3.7 |
| 10 | 0.3 | 86 | 2.4 |
| 11 | 0.7 | 80 | 2.6 |
| 12 | 1.5 | 46 | 2.4 |
| 13 | 3.0 | 48 | 0.9 |

TABLE III

Effect of diethylzinc addition on the polymerization of vinyl n-butyl ether with AHS catalyst. 50 ml. heptane, 10 ml. monomer, 1.65 molar diethylzinc solution, 0.02 ml. AHS catalyst suspension (added 5 minutes after diethylzinc addition), 2%. Polymerization at 30° C. for 2 hours.

| Run No. | Ml. of Diethylzinc Solution | Polymer Conversion, Percent | Inherent Viscosity | Percent MEK-Insoluble |
|---|---|---|---|---|
| 14 | None | 16.3 | 3.4 | 7.5 |
| 15 | 0.002 | 31.4 | 5.0 | 34.5 |
| 16 | 0.004 | 31.8 | 4.2 | 28.8 |
| 17 | 0.008 | 45.4 | 4.0 | 34.0 |
| 18 | 0.016 | 24.8 | | 26.7 |
| 19 | 0.064 | 17.7 | 3.0 | 13.3 |

The effect of the addition of TIBA to vinyl n-butyl ether prior to the addition of AHS catalyst is shown in FIGURE I and Table I. The addition of 0.1 to 0.8 ml. of TIBA solution, corresponding to TIBA/AHS molar ratio of 19 to 172, increases the polymer conversion and MEK-insoluble crystalline fraction. The addition of 1.6 ml. of TIBA solution significantly decreases the polymer yield. All the polymers were high molecular weight materials having inherent viscosity values above 3.8.

Improvement of the polymer yields due to the addition of 0.1 to 0.7 ml. of TIBA solution, corresponding to TIBA/AHS molar ratio of 7.9 to 55.3 are shown in Table II. The inherent viscosity values are slightly increased at TIBA levels of 0.1 and 0.2 ml. over the corresponding values in the control experiment.

Table III and FIGURE 2 present data on the addition of diethylzinc to vinyl n-butyl ether prior to the addition of AHS catalyst. The molar ratio of diethylzinc/AHS was varied from 6.25 to 200. The percent polymer conversion, inherent viscosity, and MEK-insoluble fraction are increased over the control values throughout the diethylzinc/AHS molar ratio of 6.25 to 50.

FIGURE 3 shows the effect of the addition of TIBA on the rate of polymerization of vinyl n-butyl ether with AHS catalyst. The reaction mixture was stirred mechanically in the flask. The half-time of polymerization (extrapolated value) in the control experiment was about 120 minutes. However, when TIBA was added prior to the addition of AHS catalyst (molar ratio of TIBA/AHS= 19:1) the half-time of polymerization decreased to about 28 minutes. The apparent first order rate constant for the early part of the polymerization was found to be .0058 min.$^{-1}$ for the control experiment and .025 min.$^{-1}$ in the presence of TIBA. Experimental data were as follows:

| | |
|---|---|
| Temp. °C | 36 |
| Monomer cc | 50 |
| n-Heptane cc | 500 |
| TIBA cc | [1] 0.5 |
| AHS cc | [2] 0.5 |

[1] 0.5 molar.
[2] 2% suspension (added 5 minutes after TIBA).

Similar results may be obtained by employing the general procedure outlined above and substituting ferric hydrosulfate for aluminum hydrosulfate.

Having provided a complete description of the invention in such manner as to distinguish it from other inventions and from what is old and having provided a description of the best mode contemplated of carrying out the invention, the scope of patent protection to be granted the invention is defined in the following claims.

What is claimed is:

1. In the polymerization of vinyl alkyl ether monomers in the presence of a metal hydrosulfate catalyst, the improvement which comprises contacting said monomer with a controlled amount of a promoter having the general formula MR$_n$ wherein:

M represents aluminum, gallium, zinc and cadmium;

R represents a member of the group consisting of an alkyl radical containing up to 10 carbon atoms, an alkenyl radical containing up to 10 carbon atoms, an aryl radical, and hydrogen, n represents the valence of M;

prior to contacting said monomer with said catalyst; and the normal ratio of the promoter to catalyst is between 1:1 and 350:1.

2. The process according to claim 1 wherein the promoter is trialkylaluminum.

3. The process according to claim 2 wherein the promoter is triisobutylaluminum and the molar ratio is between 4:1 and 175:1.

4. The process according to claim 2 wherein the promoter is triethylaluminum and the molar ratio is between 4:1 and 175:1.

5. The process according to claim 1 wherein the promoter is dialkylzinc.

6. The process according to claim 5 wherein the promoter is diethylzinc and the molar ratio is between 6:1 and 50:1.

7. The process according to claim 5 wherein the promoter is dibutylzinc and the molar ratio is between 6:1 and 50:1.

8. The process according to claim 2 wherein the catalyst is aluminum hydrosulfate.

9. The process according to claim 5 wherein the catalyst is aluminum hydrosulfate.

10. The process according to claim 3 wherein the catalyst is aluminum hexahydrosulfate.

11. The process according to claim 6 wherein the catalyst is aluminum hexahydrosulfate.

12. The process according to claim 2 wherein the catalyst is ferric hydrosulfate.

13. The process according to claim 5 wherein the catalyst is ferric hydrosulfate.

14. The process according to claim 1 wherein the monomer is vinyl n-butyl ether.

15. The process according to claim 3 wherein the monomer is vinyl n-butyl ether.

16. The process according to claim 6 wherein the monomer is vinyl n-butyl ether.

References Cited

UNITED STATES PATENTS 3,295,923   1/1967   Dickey _____ 260—91.1

HARRY WONG, Jr., *Primary Examiner.*

JOSEPH L. SCHOFER, *Examiner.*